US007583518B2

(12) United States Patent
Watanabe

(10) Patent No.: US 7,583,518 B2
(45) Date of Patent: Sep. 1, 2009

(54) INFORMATION PROCESSING DEVICE

(75) Inventor: Hayato Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 281 days.

(21) Appl. No.: 11/623,502

(22) Filed: Jan. 16, 2007

(65) Prior Publication Data
US 2007/0167055 A1    Jul. 19, 2007

(30) Foreign Application Priority Data
Jan. 17, 2006    (JP) .............................. 2006-008506

(51) Int. Cl.
*H05K 7/02* (2006.01)
*H05K 7/04* (2006.01)
(52) U.S. Cl. .................. 361/810; 361/752; 361/790
(58) Field of Classification Search .......... 361/752, 361/797, 790, 800, 600, 679, 727–728, 748, 361/802, 807, 810
See application file for complete search history.

(56) References Cited
U.S. PATENT DOCUMENTS
5,680,296 A * 10/1997 Hileman et al. ............. 361/802

| | | | |
|---|---|---|---|
| 6,373,691 B1 * | 4/2002 | Chen | 361/683 |
| 6,404,624 B1 * | 6/2002 | Jeong | 361/683 |
| 6,772,246 B2 * | 8/2004 | Kim et al. | 710/62 |
| 6,856,518 B2 * | 2/2005 | Dobbs et al. | 361/801 |
| 7,499,285 B2 * | 3/2009 | Chen et al. | 361/752 |
| 2006/0256515 A1 | 11/2006 | Watanabe | |
| 2009/0055567 A1 * | 2/2009 | Chen et al. | 710/302 |

FOREIGN PATENT DOCUMENTS
JP    2006-301816    11/2006

OTHER PUBLICATIONS
U.S. Appl. No. 11/376,344, filed Mar. 16, 2006, Kawai, et al.
U.S. Appl. No. 11/623,502, filed Jan. 16, 2007, Watanabe.

* cited by examiner

Primary Examiner—Hung S Bui
(74) Attorney, Agent, or Firm—Oblon, Spivak, McClelland, Maier & Neustadt, P.C.

(57) ABSTRACT

An information processing device is disclosed that is able to prevent displacement of an extension board caused by vibration or shock, and able to prevent deformation of the extension board and members nearby. The information processing device includes a substrate with a CPU (Central Processing Unit) mounted thereon, a housing that accommodates the substrate, an extension board arranged to be parallel to the substrate, and a supporting member that is fixed on the housing and is arranged to be parallel to at least one end surface of the substrate so that the supporting member supports the extension board.

12 Claims, 4 Drawing Sheets

INFORMATION PROCESSING DEVICE

BACKGROUND OF THE INVENTION

1. Field of the Invention

The present invention relates to an information processing device including a substrate with a CPU (Central Processing Unit) attached thereto and an extension board.

2. Description of the Related Art

It is required that a personal computer or an embedded controller be compact and occupy a small space, even when they are desktop devices. In the desktop devices, usually, a PCI (Peripheral Component Interconnect) card, which is an extension board, is embedded in order to extend functions not normally provided by the devices.

Usually, the extension board is fixed by screwing at one position of a non-engagement portion of a connector. However, when using this method, the extension board may be deformed by vibration or shock, and is liable to be displaced, and this influences performance of the device.

Especially, when the size of the device and the space occupied by the device is further reduced, the space between constituent components inside the device becomes small, and the extension board may touch components nearby during vibration or shock, and this may deform the extension board.

In addition, since the outside dimension of the extension board has a variety, usually, the extension board has various shapes and sizes in a horizontal direction and a vertical direction, for this reason, various kinds of fixing members are needed to fix various kinds of extension boards with a substrate on which a CPU is mounted. In order to avoid this problem, for example, a technique is disclosed in Japanese Laid Open Patent Application No. 2002-280766 (hereinafter, referred to as "reference 1").

In the technique disclosed in reference 1, a side of the extension board engaging with a connector and an opposite side of the extension board are restricted by a falling-off prevention member, namely, the extension board is restricted in the direction in which the connector and the falling-off prevention member are arranged. However, the extension board is not restricted in other directions, and due to this, the extension board may touch components nearby due to vibration or shock.

SUMMARY OF THE INVENTION

An embodiment of the present invention may solve one or more problems of the related art.

A preferred embodiment of the present invention may provide an information processing device able to prevent displacement of an extension board caused by vibration or shock, and able to prevent deformation of the extension board and members nearby.

According to an aspect of the present invention, there is provided an information processing device, comprising:

a substrate with a CPU (Central Processing Unit) mounted thereon;

a housing that accommodates the substrate;

an extension board that is arranged to be parallel to the substrate; and a supporting member that is fixed on the housing and is arranged to be parallel to at least one end surface of the substrate, said supporting member supporting the extension board.

According to the present invention, since the extension board is supported by the supporting member, it is possible to prevent displacement and deformation of the extension board caused by vibration or shock.

As an embodiment, a holding member is provided on the supporting member, and the supporting member supports the extension board by using the holding member.

According to the present invention, since the supporting member supports the extension board with the holding member, even when the extension board has various kinds of shapes, the extension board can be supported reliably by just changing the shape of the holding member but without changing the shape of the supporting member.

As an embodiment, the holding member is movable in a longitudinal direction of the supporting member.

According to the present invention, since the holding member is movable in a longitudinal direction of the supporting member, even when the extension board has various kinds of shapes, the extension board can be supported reliably without changing the shape of the holding member.

As an embodiment, an elongated hole is formed on one of the holding member and the supporting member in a movement direction of the supporting member, a plurality of through-holes are formed on the other one of the holding member and the supporting member at intervals less than a length of the elongated hole, and the holding member is fixed on the supporting member by fitting a fixing member into the elongated hole and the plurality of through-holes.

According to the present invention, by providing the elongated hole and the plurality of through-holes, even when the extension board has various kinds of shapes, the extension board can be supported reliably without changing the shape of the holding member and through the same procedure of assembling the same parts.

As an embodiment, the extension board is restricted by the holding member in an arrangement direction of the extension board.

According to the present invention, it is possible to prevent displacement of the extension board caused by vibration or shock, and prevent falling-off of the extension board from the arrangement position of the extension board.

As an embodiment, the supporting member is arranged to be parallel to the arrangement direction of the extension board.

According to the present invention, it is possible to prevent displacement of the extension board caused by vibration or shock in a direction parallel to the arrangement direction of the extension board, even when the extension board has various kinds of shapes.

As an embodiment, the supporting member is arranged to be perpendicular to the arrangement direction of the extension board.

According to the present invention, it is possible to prevent displacement of the extension board caused by vibration or shock in a direction perpendicular to the arrangement direction of the extension board, even when the extension board has various kinds of shapes.

Therefore, according to the present invention, since a supporting member is provided in the housing and is arranged to be parallel to at least one end surface of the substrate, and the extension board is supported by the supporting member, it is possible to prevent displacement and deformation of the extension board caused by vibration or shock, and prevent deformation and damage caused by bending or contact with other members.

These and other objects, features, and advantages of the present invention will become more apparent from the following detailed description of preferred embodiments given with reference to the accompanying drawings.

DESCRIPTION OF THE PREFERRED EMBODIMENTS

Below, preferred embodiments of the present invention are explained with reference to the accompanying drawings.

Figure 1:
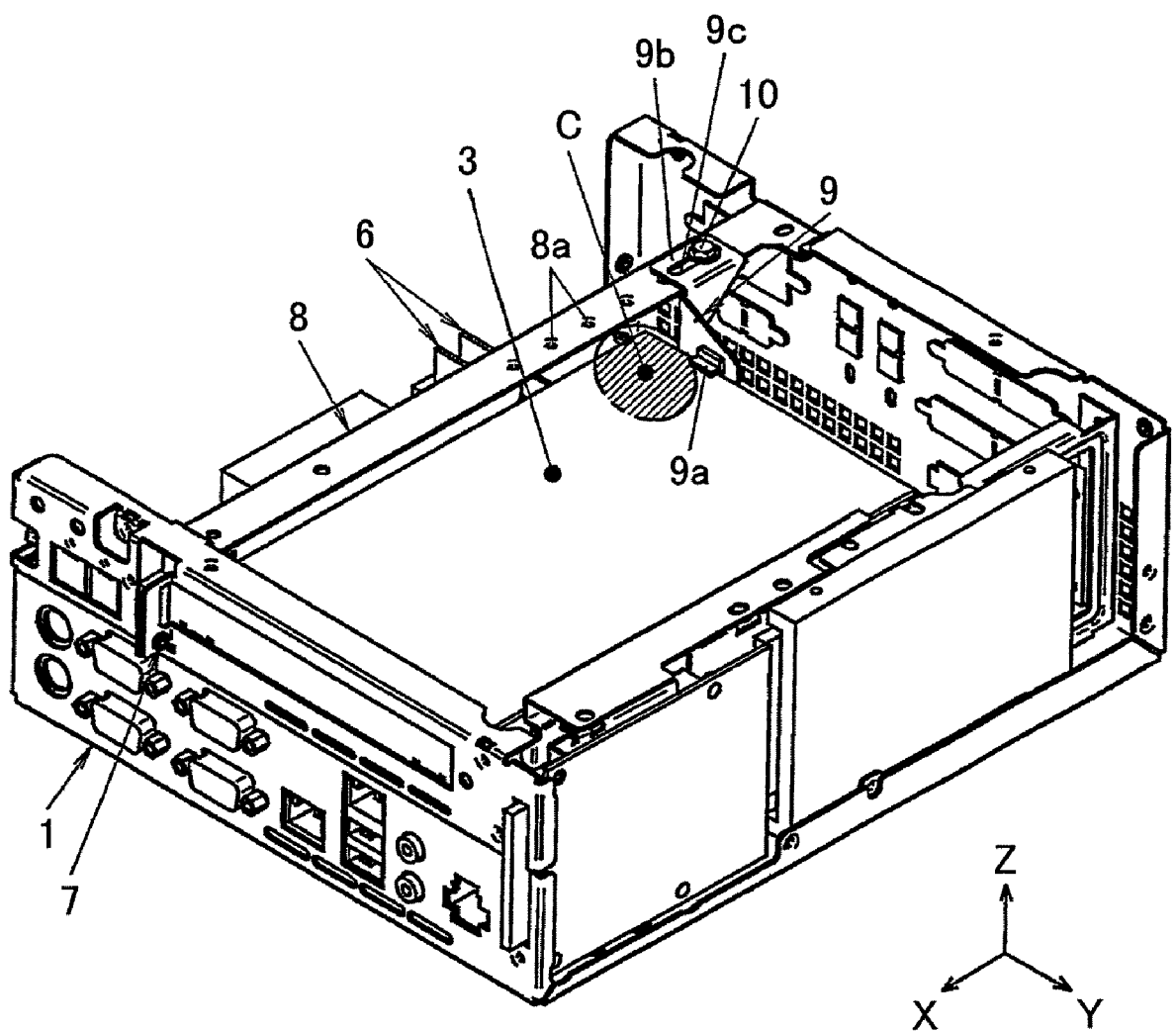
FIG. 1 is a perspective view of an information processing device according to a first embodiment of the present invention.

FIG. 1 is a perspective view of an information processing device according to a first embodiment of the present invention.

Figure 2:
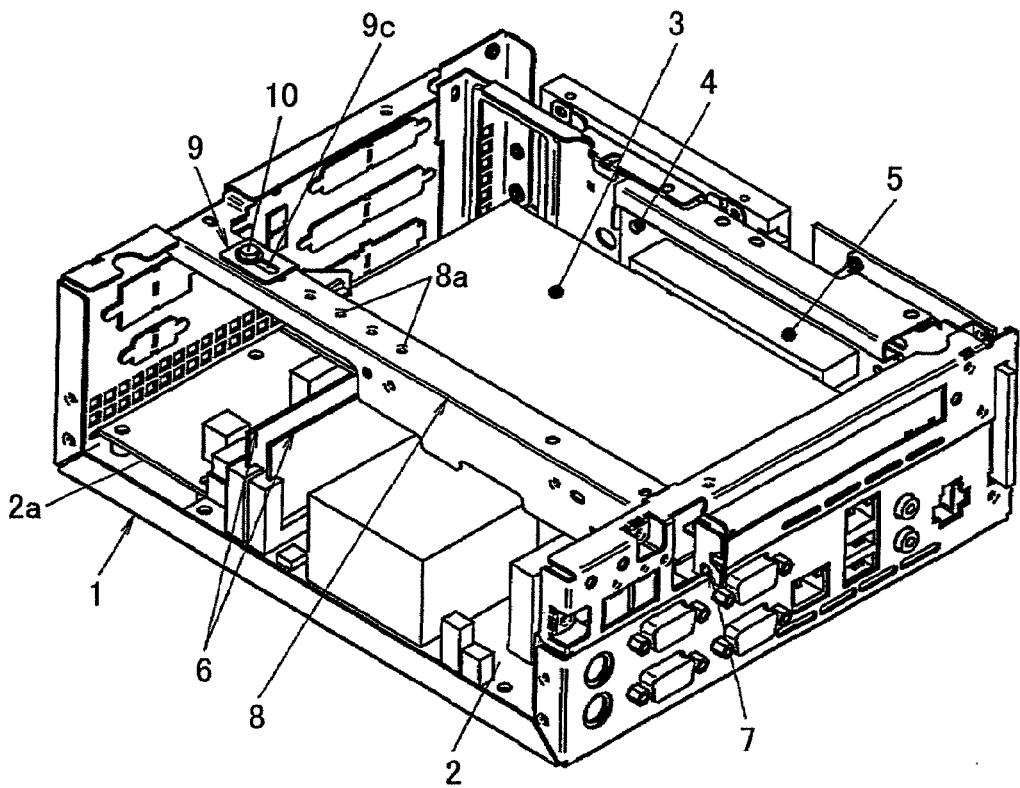
FIG. 2 is another perspective view of the information processing device according to the present embodiment of the present invention.

FIG. 2 is another perspective view of the information processing device according to the present embodiment of the present invention.

Figure 3:
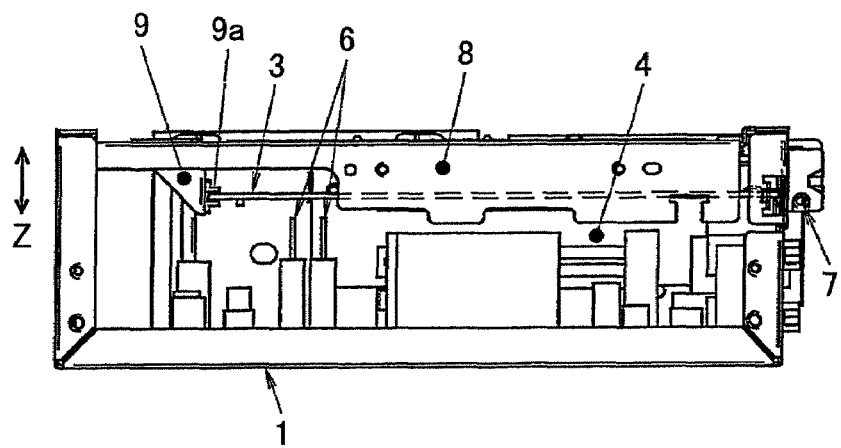
FIG. 3 is a side view of the information processing device according to the present embodiment of the present invention.

FIG. 3 is a side view of the information processing device according to the present embodiment of the present invention.

Figure 4A:
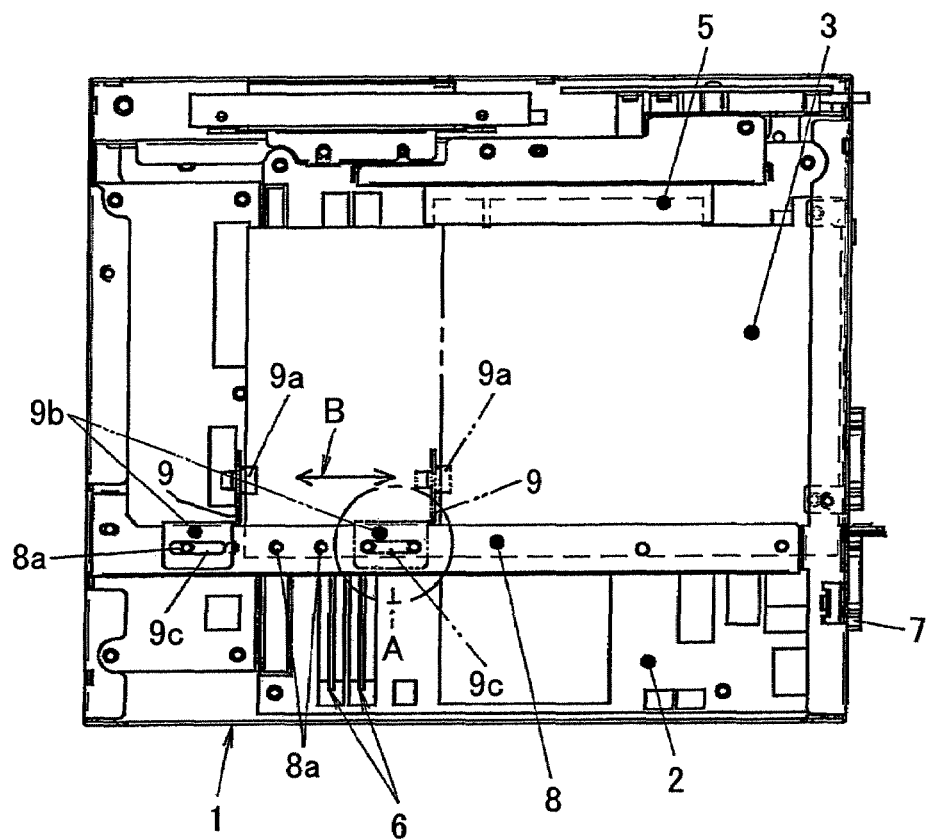
FIG. 4A is a plan view of the information processing device according to the present embodiment of the present invention.

FIG. 4A is a plan view of the information processing device according to the present embodiment of the present invention.

Figure 4B:
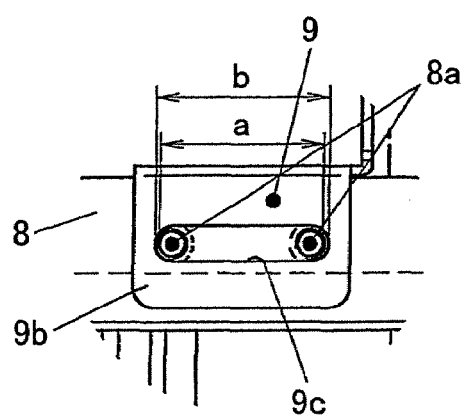
FIG. 4B is an enlarged view of a portion A in FIG. 4A.

FIG. 4B is an enlarged view of a portion A in FIG. 4A.

As shown in FIG. 1 though FIG. 4B, the information processing device of the present embodiment includes a cover structure 1, serving as a housing, a substrate 2 with a CPU (Central Processing Unit) mounted thereon (hereinafter, the substrate 2 is referred to as a "mother board"), an extension board 3 such as a PCI card, an extension slot changer 4 for changing a direction of mounting the extension board 3 (hereinafter, the extension slot changer 4 is referred to as a "riser board"), a connector 5 into which a side portion of the extension board 3 is set in, a package unit 6, such as, a memory unit, and a holding part 7 that is formed on the cover structure 1 and holding a portion of the extension board 3 with screws.

In addition, the information processing device includes a supporting member 8, which is a long plate and is fixed on the cover structure 1 with the longitudinal direction of the supporting member 8 being parallel to one end surface of the mother board 2 (for example, the end surface 2a in a longitudinal direction of the mother board 2).

In addition, the information processing device includes a holding member 9, which is a plate-shaped member including a holding part 9a and a supporting portion 9b, in which the holding part 9a pinches the extension board 3 or holds one of the upper surface and the lower surface of the extension board 3, and the supporting portion 9b is set on the supporting member 8 while being movable in the longitudinal direction of the supporting member 8 (the direction the an arrow B in FIG. 4A).

As illustrated in FIG. 4B, the supporting portion 9b of the holding member 9 has an elongated hole 9c serving as a mounting hole, and in the supporting member 8, there are formed plural through-holes 8a, for example, the through-holes 8a may be screw holes. The interval (represented by "a") of the through-holes 8a in the supporting member 8 is less than a length b of the elongated hole 9c in the holding member 9 in the longitudinal direction. The supporting portion 9b of the holding member 9 can be moved to position the supporting portion 9b to fit the outer dimension of the extension board 3 and to align the through-holes 8a with the elongated hole 9c, and as shown in FIG. 1 and FIG. 2, a screw 10, which serves as a fixing member, can be inserted into the through-holes 8a and the elongated hole 9c to fix the supporting portion 9b of the holding member 9 to the supporting member 8.

Below, the present embodiment is explained in more detail.

The extension board 3 is arranged above the mother board 2. In a holding structure of the extension board 3 in the related art, the extension board 3 is held by the connector 5 mounted on the riser board 4 and a holding member formed on the cover structure 1. Since there is not the holding member 9 as in the present embodiment, a portion C (refer to FIG. 1) of the extension board 3 far from the holding part 7 (that is, the end the extension board 3 held by the holding part 9a in the present embodiment.) is not supported by anything. For this reason, when an external force is imposed on the device in the Z direction (refer to FIG. 1 and FIG. 3), the extension board 3 can be bent and deformed, and as a result, the extension board 3 may touch other members nearby, and this may cause deformation and damage.

In contrast, in the present embodiment, the portion C of the extension board 3 (the portion in a direction perpendicular to the arrangement direction of the extension board 3) is held by the supporting member 8 with the holding member 9, and thus the portion C of the extension board 3 is restricted. As a result, even when an external force is imposed on the device in the Z direction, the extension board 3 does not bend and does not touch the package unit 6 or other members nearby.

In addition, since the outer dimension of the extension board 3 has a variety, and has various sizes in the X and Y direction, in order to use the supporting member 8 to support such an extension board 3, the holding member 9 is set to be movable. Specifically, the supporting portion 9b of the holding member 9 is movable to fit the outer dimension of the extension board 3 so that the holding part 9a of the holding member 9 holds the free end of the extension board 3 (for example, the end of the portion C in FIG. 1), and when positions of the through-holes 8a with the elongated hole 9c are aligned, the screw 10 can be inserted into the through-holes 8a and the elongated hole 9c to fix these members, thereby, the holding member 9 is fixed to the supporting member 8, and the holding part 9a can reliably hold the extension board 3.

Figure 5:
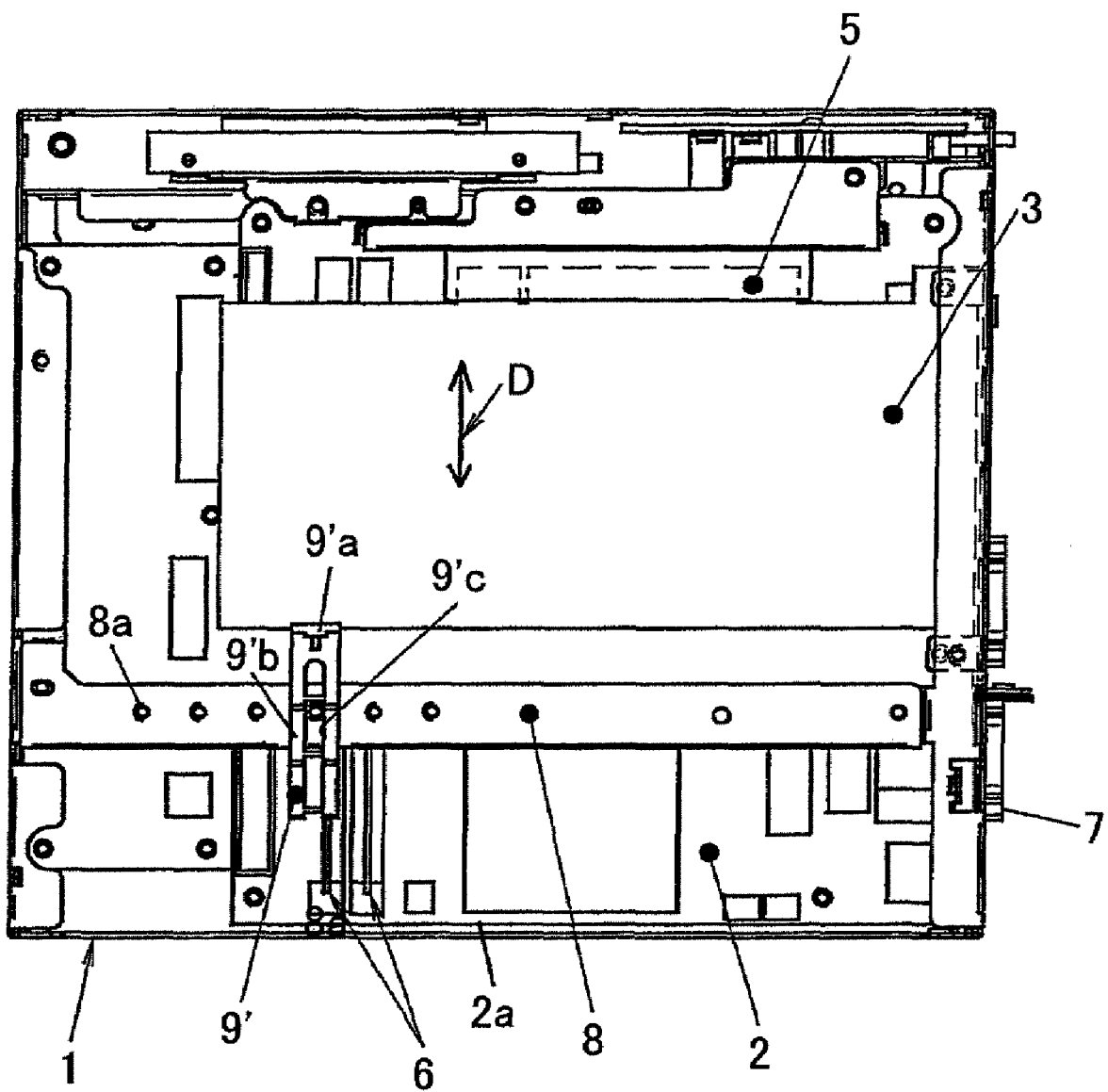
FIG. 5 is a plan view of an information processing device according to a second embodiment of the present invention.

FIG. 5 is a plan view of an information processing device according to a second embodiment of the present invention.

In FIG. 5, the same reference numbers are assigned to the same elements as illustrated in FIG. 1 through FIG. 4B, and overlapping descriptions are omitted.

The configuration in FIG. 5 differs from those in FIG. 1 through FIG. 4B in that a holding member 9' including a holding part 9'a, a supporting portion 9'b, and an elongated hole 9'c is arranged to be parallel to the arrangement direction D of the connector 5 to restrict the side end of the extension board 3 in the arrangement direction D of the connector 5. Therefore, it is possible to present falling-off of the extension board 3 from the connector 5.

It should be noted that as the structure for holding the extension board 3, the supporting member 8 may be arranged to be perpendicular to parallel to the arrangement direction D of the extension board 3.

This invention can be applied to a personal computer or an embedded controller used in an information processing device, for example, household electronic devices having an extension board.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Application No. 2006-008506 filed on Jan. 17, 2006, the entire contents of which are hereby incorporated by reference.

What is claimed is:

1. An information processing device, comprising:
   a substrate with a CPU (Central Processing Unit) mounted thereon;
   a housing accommodating the substrate,
   an extension board arranged parallel to the substrate; and
   a supporting member disposed on the housing parallel to at least one end surface of the substrate, said supporting member supporting the extension board,
   wherein
   a holding member is disposed on the supporting member,
   the supporting member is configured to support the extension board via the holding member,
   an elongated hole is disposed on one of the holding member and the supporting member in a direction parallel to a longitudinal direction of the supporting member,
   a plurality of through-holes are disposed on the other one of the holding member and the supporting member at intervals less than a length of the elongated hole, and
   the holding member is configured to be fixed on the supporting member by fitting a fixing member into the elongated hole and the plurality of through-holes.

2. An information processing device, comprising:
   a substrate with a CPU (Central Processing Unit) mounted thereon;
   a housing accommodating the substrate;
   an extension board arranged parallel to the substrate; and
   a supporting member disposed on the housing parallel to at least one end surface of the substrate, said supporting member supporting the extension board,
   wherein
   a holding member is disposed on the supporting member,
   said holding member includes a holding part configured to contact and hold the extension board, and
   the supporting member is configured to support the extension board via the holding member.

3. The information processing device as claimed in claim 2, wherein the holding member is configured to move in a direction parallel to the longest dimension of the supporting member.

4. The information processing device as claimed in claim 2, wherein the extension board is restricted by the holding member in an arrangement direction of the extension board, wherein the arrangement direction of the extension board is a direction parallel to a direction in which the extension board is inserted into a connector.

5. The information processing device as claimed in claim 4, wherein the supporting member is configured to be parallel to the arrangement direction of the extension board.

6. The information processing device as claimed in claim 4, wherein the supporting member is configured to be perpendicular to the arrangement direction of the extension board.

7. The information processing device as claimed in claim 2, wherein the holding member is a single piece.

8. The information processing device as claimed in claim 2, wherein the holding part holds the free end of the extension board that is adjacent to a side portion of the extension board disposed in a connector.

9. The information processing device as claimed in claim 2, wherein the holding part holds the free end of the extension board that is opposite to a side portion of the extension board disposed in a connector.

10. The information processing device as claimed in claim 2, wherein the holding part is configured to pinch the extension board.

11. The information processing device as claimed in claim 2, wherein the holding part is configured to hold at least one of an upper surface or lower surface of the extension board.

12. The information processing device as claimed in claim 2, wherein the supporting member is configured to support the extension board via the holding member such that the holding member holds a free end of the extension board.

* * * * *